(12) United States Patent
Freienstein et al.

(10) Patent No.: US 10,391,962 B2
(45) Date of Patent: Aug. 27, 2019

(54) METHOD FOR ACTIVATING A PASSENGER PROTECTION DEVICE OF A VEHICLE AND A CONTROL UNIT

(71) Applicant: Robert Bosch GmbH, Stuttgart (DE)

(72) Inventors: Heiko Freienstein, Weil der Stadt (DE); Gunther Lang, Stuttgart (DE); Josef Kolatschek, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 15/603,579

(22) Filed: May 24, 2017

(65) Prior Publication Data

US 2017/0355336 A1    Dec. 14, 2017

(30) Foreign Application Priority Data

Jun. 14, 2016 (DE) .................. 10 2016 210 491

(51) Int. Cl.
| | |
|---|---|
| *B60R 21/0136* | (2006.01) |
| *B60R 21/0132* | (2006.01) |
| *B60R 21/01* | (2006.01) |
| *B60R 21/013* | (2006.01) |

(52) U.S. Cl.
CPC ...... *B60R 21/0136* (2013.01); *B60R 21/0132* (2013.01); *B60R 2021/0104* (2013.01); *B60R 2021/01013* (2013.01); *B60R 2021/01034* (2013.01); *B60R 2021/01211* (2013.01); *B60R 2021/01272* (2013.01); *B60R 2021/01286* (2013.01); *B60R 2021/01311* (2013.01); *B60R 2021/01313* (2013.01)

(58) Field of Classification Search
CPC ............ B60R 21/0136; B60R 21/0132; B60R 2021/01013
USPC ............................................................. 701/45
See application file for complete search history.

(56) References Cited

U.S. PATENT DOCUMENTS

| | | | |
|---|---|---|---|
| 2009/0299576 A1* | 12/2009 | Baumann ............ | B60R 21/0134 701/45 |
| 2011/0130111 A1* | 6/2011 | Crandall ............... | B60R 21/013 455/404.1 |
| 2016/0368490 A1* | 12/2016 | Erban ................... | B60W 30/08 |

FOREIGN PATENT DOCUMENTS

EP    3354525 A1 *   8/2018   ......... B60T 8/17558

* cited by examiner

*Primary Examiner* — Yazan A Soofi
(74) *Attorney, Agent, or Firm* — Norton Rose Fulbright US LLP; Gerard Messina

(57) ABSTRACT

A method for activating a passenger protection device of a vehicle. A relative velocity value, which represents a relative velocity between the vehicle and an object, and at least one correction value are read in. In a further step, a velocity reduction value, which represents a decrease of a velocity of the vehicle when the vehicle collides with the object, is ascertained using the relative velocity value and the correction value. Finally, an activation signal for activating the passenger protection device is generated using the velocity reduction value.

16 Claims, 2 Drawing Sheets

METHOD FOR ACTIVATING A PASSENGER PROTECTION DEVICE OF A VEHICLE AND A CONTROL UNIT

CROSS REFERENCE

The present applications claims the benefit under 35 U.S.C. § 119 of German Patent Application No. DE 102016210491.8 filed on Jun. 14, 2016, which is expressly incorporated herein by reference in its entirety.

FIELD

The present invention relates to a device and a method for activating a passenger protection device of a vehicle. The present invention also relates to a computer program.

In conventional passenger protection systems for vehicles, information of anticipatory sensors, such as radar sensors, LIDAR sensors or camera sensors, may be used to generate a triggering decision. With the aid of such sensors, it is possible, for example, to measure a relative velocity between a vehicle and an object.

SUMMARY

A method for activating a passenger protection device of a vehicle, a control unit which uses this method and, finally, a corresponding computer program are provided in accordance with the present invention. Advantageous refinements of and improvements on the device described herein are possible with the measures described herein.

An example method for activating a passenger protection device of a vehicle is presented, the method including the following steps:

reading in a relative velocity value, which represents a relative velocity between the vehicle and an object and optionally reading in at least one correction value;

ascertaining a velocity reduction value, which represents a reduction in velocity of the vehicle when the vehicle collides with the object, using the relative velocity value and, optionally, the correction value; and generating an activation signal for activating the passenger protection device using the velocity reduction value.

A passenger protection device may be understood to mean, for example, an active, passive or integrated safety system. The passenger protection system may include, for example, restraint means such as airbags or seatbelt tighteners, a pedestrian protection system or adaptive crash structures. The passenger protection device may also be designed to automatically steer or decelerate the vehicle in the event of an imminent collision. A vehicle may be understood to mean a motor vehicle such as, for example, a passenger vehicle or a truck. The object may be, for example, another vehicle, a pedestrian or a fixed object such as, for example, a tree, a bridge pillar or a building. The relative velocity value may be ascertained, for example, using at least one vehicle sensor of the vehicle. The vehicle sensor may be, in particular, an anticipatory surroundings sensor such as, for example, a camera, a radar sensor or an ultrasonic sensor. In addition to the relative velocity, the surroundings sensor may, for example, also provide additional information about an opposing vehicle before a crash. The velocity reduction value may also be ascertained using the vehicle sensor. A correction value may be understood to mean, for example, a piece of information about the mass, size or type of the other vehicle. A correction factor may be understood to mean a function of the correction value, by which the relative velocity value may be multiplied in order to increase or reduce the relative velocity value, for example, as a function of a mass of the vehicle or a mass of the object. A velocity reduction value may be understood to mean a difference between a velocity of the vehicle before the collision and an expected velocity of the vehicle after the collision. A velocity reduction value may be understood to mean an expected velocity reduction value insofar as this value may be ascertained based solely on anticipatory sensors before the crash. With the expected velocity reduction value, it is possible to later influence a classic airbag algorithm, for example. The velocity reduction value may, in particular, be a positive value. For example, the activation signal may be generated in the step of generating in order to activate the passenger protection device already before the collision without using a classic crash sensor system such as, for example, acceleration sensors or pressure sensors (pre-trigger). Alternatively, triggering thresholds of an acceleration-based or pressure-based triggering algorithm may be adapted with the aid of the velocity reduction value (preset).

According to one specific embodiment, a correction value, for example, in the form of a piece of information about a mass of an opposing vehicle or of an object type may be optionally read in in the step of reading in. According to one specific embodiment, an ascertainment of a correction factor is carried out, if necessary, using the read-in correction value.

The approach presented herein is based on the finding that by correcting a relative velocity value, which represents a detected relative velocity between a vehicle and an object, in particular, by a mass correction of the relative velocity, an expected velocity decrease of the vehicle may be reliably and accurately ascertained. The ascertained velocity decrease may be used as an input variable for a passenger protection device of the vehicle, for example, for an acceleration-based or pressure-based triggering algorithm of an airbag. The approach presented herein takes into account the fact that opposing accident vehicles in the field—in contrast to tests in a crash hall—have finite masses, so that the velocity decrease in the field is usually less than the relative velocity. With the aid of the approach presented herein, it is now possible, for example, to prevent the passenger protection device from generally responding too sensitively in the field. This may ensure a particularly precise and robust triggering behavior in the field.

The detection of vehicle collisions in airbag control units is generally based on information from acceleration sensors or pressure sensors mounted in the vehicle. The measured signals of these sensors are normally suitably processed, for example, filtered or integrated and compared against triggering thresholds in order to arrive at a triggering decision. For such algorithms, it may be difficult to discriminate, for example, between a frontal collision at low velocity against a hard obstruction, i.e., a non-triggering situation, and a frontal collision at high velocity against a soft obstruction, i.e., a triggering situation, because in the second case the high collision velocity does not manifest itself in a higher acceleration signal due to the soft obstruction.

The relative velocity is generally utilized to adapt the level of a triggering threshold of a triggering algorithm, which may be based on acceleration signals or pressure signals, for example, to lower it in a collision at a high relative velocity, in order to arrive all the more quickly at a triggering decision. Such algorithms are also referred to as preset algorithms.

The design of airbag triggering algorithms, i.e., generally the establishment of the triggering thresholds, is generally achieved based on a series of crash hall tests. These are standardized to a large extent by legal regulations and consumer tests. A front may be designed, for example, with the aid of barrier tests using hard barriers and angles of 0° and 30° and with the aid of tests using deformable barriers, also called offset deformable barrier or, in short, ODB, for example, having an overlap of 40 percent. These tests have in common the fact that the barriers used are significantly heavier than the vehicles. This means that in crash tests, the relative velocity between vehicle and object and the velocity decrease in the crash are nearly identical.

The approach presented herein now makes it possible to integrate information regarding the relative velocity, which has been detected by an anticipatory sensor such as, for example, a radar sensor or LIDAR sensor or a camera of a vehicle, into a conventional algorithm so that all differences between collisions in a crash hall having immobile barriers assumed to be of infinite weight and collisions in the field with mobile accident objects normally of finite weight having a mass similar to the vehicle may be accounted for. For example, a corresponding method may serve as a direct basis for a so-called pre-trigger system, in which triggering decisions may be made without acceleration sensors or pressure sensors and, therefore, potentially already before a collision occurs.

According to one specific embodiment, a correction factor may be determined in the step of ascertaining using the correction value and the relative velocity value may be multiplied by the correction factor in order to ascertain the velocity reduction value. A correction factor may be understood to mean a function of the correction value. For example, a mass of the object may be read in via Car2X communication in the step of reading in as the correction value, and from which the correction factor according to $$\frac{m_{obj}}{m_{ego} + m_{obj}}$$

may be calculated. This enables a correction of the relative velocity value with minimum computing effort.

According to another specific embodiment, a value may be read in in the step of reading in as the correction value, which represents a mass of the vehicle, a mass of the object, a type of object, a size of the object or a restitution coefficient or a combination of at least two of the cited variables. This enables a particularly accurate correction of the relative velocity value and, therefore, a particularly accurate ascertainment of the velocity reduction value.

It is advantageous if in the step of ascertaining, the expected velocity reduction value is ascertained using the following equation:

$$dv_{ego} = v_{rel} \frac{m_{obj}}{m_{ego} + m_{obj}}$$

In this way, the expected velocity reduction value may be reliably ascertained and with minimum computing effort as a function of the mass of the vehicle and of the mass of the object. Even in the event that no correction value, such as the mass of the opposing vehicle or the type of object, may be read in, a range for the expected velocity decrease may still be determined using the known mass of the host vehicle and assuming an average mass of the opposing vehicle.

In addition, a value may be ascertained in the step of ascertaining as the velocity reduction value, which is smaller than the relative velocity value. In this way, it is possible to avoid erroneous triggering of the passenger protection device, for example, in the case of collisions at high relative velocity, but with minimum velocity decrease.

According to another specific embodiment, the method may include a step of changing the relative velocity value in order to obtain a changed relative velocity value. In this case, the velocity reduction value may be ascertained in the step of ascertaining using the changed relative velocity value. In this way, the velocity reduction value may be adapted by changing the relative velocity value.

It is also advantageous if, in the step of reading in, a value is read in as the correction value, which represents at least one value read in via an interface to at least one additional vehicle and, additionally or alternatively, to a vehicle-external database. The interface may, for example, be a Car2X interface. The read-in value representing the correction value may, for example, be a mass, a size, a state of movement or a type of the other vehicle. This enables a particularly accurate and reliable ascertainment of the velocity reduction value.

According to another specific embodiment, a sensor signal generated by at least one sensor of the vehicle may be read in in the step of reading in. The activation signal may be generated in the step of generating using the sensor signal. The sensor signal may, in particular, be a signal of a pressure sensor or of an acceleration sensor or of another sensor of a classic crash sensor system.

In the step of generating, for example, threshold values for processed acceleration signals or processed pressure signals may be adapted on the basis of the expected velocity reduction value (preset). Alternatively, no signals at all of a classic crash sensor system are required for the triggering (pretrigger). With this specific embodiment, it is possible to further enhance the robustness of the method.

Furthermore, an additional correction value may be read in in the step of reading in, whereby the additional correction value may represent a rotation energy of the vehicle during the collision. Accordingly, the velocity reduction value may be ascertained in the step of ascertaining using the additional correction value. In this way, the velocity reduction value may be ascertained as a function of a portion of a kinetic energy of the vehicle converted into rotation energy during the collision.

It is also advantageous if, in the step of generating, the activation signal is generated in order to modify at least one activation threshold value for activating the passenger protection device based on acceleration sensors or pressure sensors (preset) or to directly activate passenger protection means without waiting for acceleration signals or pressure signals during the crash (pre-trigger). In this way, a protective effect of the passenger protection device may develop early and completely.

In addition, the activation signal may be generated in the step of generating if the velocity reduction value lies within a reference value range. In addition or alternatively, the activation signal may be generated in the step of generating if the velocity reduction value is greater than the reference value. In this way, the activation signal may be generated, and thus, very rapidly, by a simple comparison of the velocity reduction value with the reference value range or with the reference value. Multiple varying reference value ranges ("velocity categories") are also possible, in which the activation thresholds are variously influenced.

According to another specific embodiment, the activation signal may be generated in the step of generating in order to reduce the activation threshold value if the velocity reduction value is greater than the reference value. With this specific embodiment, it is possible to particularly rapidly reduce the activation threshold value.

This method may, for example, be implemented in software or in hardware or in a mixed form of software and hardware, for example, in a control unit.

The approach presented herein also provides a control unit, which is designed to carry out, activate or implement the steps of a variant of a method presented herein in corresponding devices. With this embodiment variant of the present invention in the form of a control unit as well, it is possible to rapidly and efficiently achieve the object underlying the present invention.

For this purpose, the control unit may include at least one processing unit for processing signals or data, at least one memory unit for storing signals or data, at least one interface to a sensor or to an actuator for reading in sensor signals from the sensor or for outputting control signals to the actuator and/or at least one communication interface for reading in or outputting data, which are embedded in a communication protocol. The processing unit may, for example, be a signal processor, a microcontroller or the like, whereby the memory unit may be a flash memory, an EPROM or a magnetic memory unit. The communication interface may be designed to read in or output data wirelessly and/or by wire, whereby a communication interface, which is able to read in or output hard-wired data, may, for example, read in these data electrically or optically from a corresponding data transmission line or may output them into a corresponding data transmission line.

A control unit in the present case may be understood to mean an electrical device, which processes sensor signals and outputs control signals and/or data signals as a function thereof. The control unit may include an interface, which may be designed in hardware and/or in software. In a hardware design, the interfaces may, for example, be part of a so-called system ASIC, which contains a wide variety of functions of the control unit. It is also possible, however, for the interfaces to be dedicated integrated circuits or to be made at least partly of discrete components. In a software design, the interfaces may be software modules, which are present, for example, on a microcontroller alongside other software modules.

In one advantageous embodiment, the control unit controls a braking system, a steering or an engine of the vehicle. For this purpose, the control unit may, for example, access sensor signals, such as surroundings, pressure, acceleration, steering or brake sensor signals. The activation takes place via corresponding actuators, such as steering actuators or brake actuators.

Also advantageous is a computer program product or computer program having program code, which may be stored on a machine-readable carrier or memory medium, such as a semiconductor memory, a hard disk memory or an optical memory, and which is used for carrying out, implementing and/or activating the steps of the method according to one of the previously described specific embodiments, in particular, when the program product or program is executed on a computer or a device.

Exemplary embodiments of the present invention are depicted in the figures and explained in greater detail below.

DETAILED DESCRIPTION OF EXAMPLE EMBODIMENTS

Figure 1:
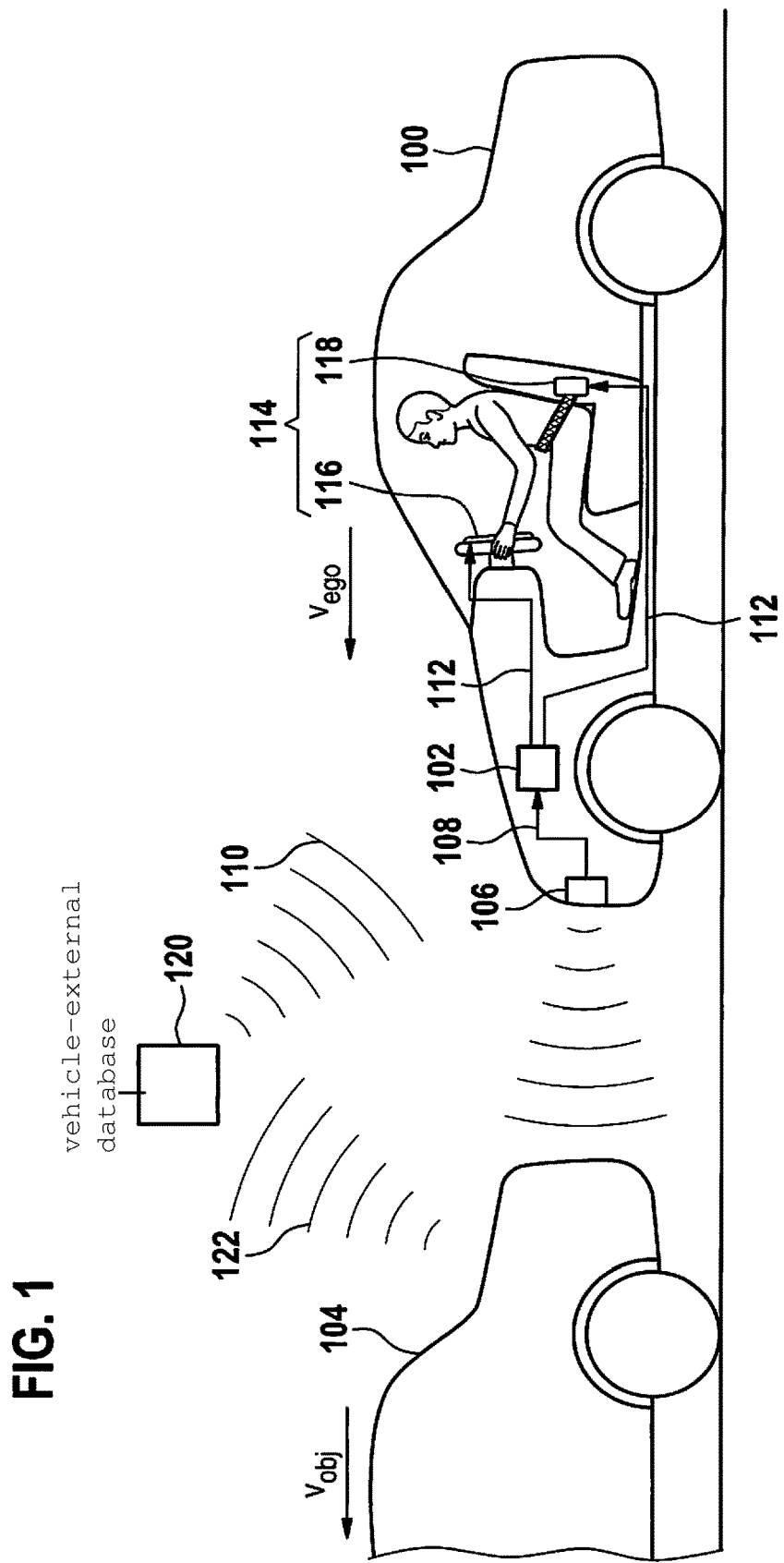
FIG. 1 schematically shows a vehicle including a control unit according to one exemplary embodiment.

In the following description of preferred exemplary embodiments of the present invention, identical or similar reference numerals are used for elements which are represented in the various figures and act similarly, a repeated description of these elements being omitted.

FIG. 1 shows a schematic representation of a vehicle 100 including a control unit 102 according to one exemplary embodiment. Vehicle 100 is driving at a velocity $v_{ego}$ behind an object, in this case another vehicle 104, which has a velocity $v_{obj}$. Control unit 102 is connected to a surroundings sensor 106. Surroundings sensor 106, which may be part of an anticipatory sensor system of vehicle 100, is designed to detect velocity $v_{obj}$, to ascertain a relative velocity $v_{rel}$ between the two vehicles 100, 104 using the two velocities $v_{obj}$, $v_{ego}$, and to send a relative velocity value 108 representing relative velocity $v_{rel}$ to control unit 102. Alternatively, the surroundings sensor may also measure relative velocity $v_{rel}$ directly and send it to control unit 102. Control unit 102 is designed to ascertain a velocity reduction $dv_{ego}$ of vehicle 100 when colliding with other vehicle 104 using relative velocity value 108 and an optional correction value 110, for example, by multiplying relative velocity value 108 by a correction factor ascertained using correction value 110. Control unit 102 generates an activation signal 112 as a function of ascertained velocity reduction $dv_{ego}$ for activating a passenger protection device 114 of vehicle 100. Passenger protection device 114 in FIG. 1 includes, for example, an airbag 116 and a seatbelt tightener 118.

According to this exemplary embodiment, control unit 102 is designed to read in correction value 110 via an interface to a vehicle-external database 120, which is connected via an additional interface to other vehicle 104. The two vehicles 100, 104 are each connected via a Car2X interface, for example, to database 120. Alternatively, the two vehicles 100, 104 may be designed to communicate directly with one another via the interfaces. In this case, for example, other vehicle 104 sends a piece of vehicle information 122 regarding certain parameters characterizing other vehicle 104, such as mass, weight, size, type or state of movement, to database 120. Database 120 is designed to generate correction value 110 using piece of vehicle information 122, i.e., as a function of the mass, the weight, the size, the type or the state of movement of other vehicle 104, and to send it to vehicle 100. Alternatively, control unit 102 itself generates correction value 110 using, for example, sensor data provided by surroundings sensor 106, which represent, for example, the mass, the size or the type of other vehicle 104. Correction value 110 may optionally represent a restitution coefficient k regarding a collision of the two vehicles 100, 104. Control unit 102 then calculates the correction factor using the correction value in the sense of a piece of information about mass, size or type of other vehicle 104.

Instantaneous preset algorithms generally use the relative velocity as a measure for an expected velocity decrease, i.e. for a velocity decrease caused by an imminent collision, also referred to above as velocity reduction. Based on this, an adaptation of triggering threshold values takes place, in particular, empirically on the basis of crash tests.

However, since the expected velocity decrease is a function not only of the relative velocity, but also of a mass distribution of the two opposing colliding vehicles, other features, which permit conclusions about a mass of the opposing accident vehicle, should preferably also be incorporated in the ascertainment of the expected velocity decrease. This is now possible with the aid of the approach described herein. These additional features may be detected, for example, by an anticipatory sensor system. Such a mass-corrected relative velocity may thus be utilized for reliably generating an accurate evaluation point in time at which passenger protection device 114 is to be triggered.

In the case of a sufficient and reliable number of features, for example, which permit conclusions to be drawn about the mass of the opposing accident vehicle, the expected velocity decrease, in addition, for example, to other features detected by the anticipatory sensor system, may be used for directly activating restraint means of passenger protection device 114, i.e., without taking an acceleration sensor system or pressure sensor system into account. Such systems are also referred to as pre-trigger systems.

The present invention is explained in greater detail below with reference to various exemplary embodiments.

The velocity decrease $dv_{ego}$ to be expected during a vehicle collision may be sufficiently estimated in the inelastic borderline case with the aid of the conservation of momentum.

If $v_{ego}$ refers to the velocity and $m_{ego}$ refers to the mass of vehicle 100 in question before the collision, $v_{obj}$ refers to the velocity and $m_{obj}$ refers to the mass of other vehicle 104 before the collision, then the conservation of momentum in the inelastic borderline case is $$m_{ego}v_{ego} + m_{obj}v_{obj} = (m_{ego} + m_{obj})v_{end}$$

Here, $v_{end}$ refers to the velocity of both vehicles 100, 104 after the collision. For velocity decrease $dv_{ego}$ of vehicle 100 as a result of the collision $$dv_{ego} = v_{ego} - v_{end},$$

this yields with few transformations the relationship $$dv_{ego} = (v_{ego} - v_{obj}) \frac{m_{obj}}{m_{ego} + m_{obj}} = v_{rel} \frac{m_{obj}}{m_{ego} + m_{obj}}$$

Accordingly, velocity decrease $dv_{ego}$ is a function only of relative velocity $v_{rel} = v_{ego} - v_{obj}$ and of the mass distribution between the two vehicles 100, 104.

The velocities of the two vehicles 100, 104 are indicated here with respect to a common direction, in particular in the direction of movement of vehicle 100 in question. This means that oncoming opposing accident vehicles have a negative value of $v_{obj}$, so that $v_{rel} = v_{ego} - v_{obj}$ is greater than $v_{ego}$. In the case of rear-end collisions on the other hand, $v_{obj} >= 0$, so that $v_{rel} <= v_{ego}$. Relative velocity $v_{rel}$ assumes a positive value in all cases in which the vehicles move toward one another and a collision results. It assumes a negative value if the vehicles move away from one another.

Velocity decrease $dv_{ego}$ is defined, for example, so that it always assumes positive values for vehicle 100 in question.

The following values result for velocity decrease $dv_{ego}$ as a function of mass $m_{obj}$ of the object, with which vehicle 100 threatens to collide:

| $m_{obj}$ | $dv_{ego}$ |
|---|---|
| ∞ | $v_{rel}$ |
| $2m_{ego}$ | $2/3\ v_{rel}$ |
| $m_{ego}$ | $1/2\ v_{rel}$ |
| $1/2\ m_{ego}$ | $1/3\ v_{rel}$ |

Only in the case of an object of infinite weight, for example, a bridge pillar, does relative velocity $v_{rel}$ equal velocity decrease $dv_{ego}$. As the mass of the opposing accident vehicle decreases, so too does velocity decrease $dv_{ego}$ of ego-vehicle 100 in question.

If, for example, vehicle 100 having a velocity $v_{ego}$ of 50 km/h collides with other vehicle 104 having a velocity $v_{obj}$ of 10 km/h with the same mass, then $v_{rel}$=40 km/h and $dv_{ego}$=20 km/h. Even though the value of relative velocity $v_{rel}$, suggests a high accident velocity with required two-stage airbag triggering, in particular, analogously to crash hall tests, it is actually only a minor accident in which a triggering of the seat-belt tightener may be sufficient.

The aforementioned formula for velocity decrease $dv_{ego}$ is derived from the idealized borderline case of a central inelastic collision, but it also describes very aptly the velocity decrease in real and not fully central collisions.

Elastic components in vehicle 100 may also be taken into consideration, for example, by restitution coefficient k, where k=0 in the inelastic borderline case; k=1 in the elastic borderline case. An additional factor (1+k) may also be formed from restitution coefficient k, which may be used for ascertaining velocity decrease $dv_{ego}$ with the aid of the aforementioned formula. Thus, the actual velocity decrease for real collisions with k<<1 is thus slightly higher than in the inelastic borderline case. However, the underlying relationship with respect to the mass distribution does not change.

In the case of non-central collisions, i.e., in collisions with offset or incomplete overlap, a certain portion of the kinetic energy of vehicle 100 is converted into rotation energy. Thus, velocity decrease $d_{vego}$ caused by inelastic deformation is somewhat less than in the case of a central collision. Significant differences first appear, however, in the case of very minimal overlaps such as, for example, in the IIHS small overlap crash. Here too, however, the basic mass dependency remains the same.

Instead of the relative velocity, control unit 102 now uses velocity decrease $dv_{ego}$ as a measure for an expected velocity decrease, for example, as an input variable for an acceleration-based or pressure-based triggering algorithm for triggering passenger protection device 114:

$$dv_{ego} = f \cdot v_{rel}$$

with a correction factor $$f = \frac{m_{obj}}{m_{ego} + m_{obj}}$$

as a function of correction value 110, which takes the mass ratio of the two colliding vehicles 100, 104 into consideration.

Normally, anticipatory sensors provide values for relative velocity $v_{rel}$, but not for object mass $m_{obj}$, so that second essential parameter f for expected velocity decrease $dv_{ego}$ is unknown. Control unit 102 ascertains velocity decrease $dv_{ego}$ in different ways, depending on the exemplary embodiment.

In a first case, no object information is available regarding the object, i.e. other vehicle 104. Even in the case of missing direct object information, it should be noted that an anticipatory sensor system such as, for example, surroundings sensor 106, is designed for applications, such as adaptive cruise control, distance assistance or emergency braking assistance. This means, the anticipatory sensor system detects, in particular, preceding vehicles, but typically no stationary objects or oncoming vehicles.

Thus, the normal application of an airbag algorithm influenced by the anticipatory sensor system is the collision with vehicles of similar mass.

This case is taken into consideration in control unit 102, for example, by a fixed correction factor f not dependent on the opposing accident vehicle, which preferably takes the net mass $m_{ego}$ of vehicle 100 into consideration, $$dv_{ego} = f(m_{ego}) \cdot v_{rel}$$

For vehicles of average weight, for example, f=0.5.

For vehicles of above-average weight, f<0.5. For example, a vehicle having double the average vehicle mass is described on average as f=⅓.

For vehicles of below-average weight, f>0.5. For example, a vehicle having half the average vehicle mass is described on average as f=⅔.

The remaining uncertainty regarding object mass $m_{obj}$ is taken into consideration in the design of the airbag algorithm, for example, by corresponding variation of relative velocity $v_{rel}$ in the application of the triggering algorithm of control unit 102.

If, for example, collisions with opposing vehicles between half and double the net mass are to be considered for a vehicle of average weight (f=0.5), the result in the likeliest case of an opposing accident vehicle of average weight is a span of the expected velocity decrease between ⅓ $v_{rel}$ and ⅔ $v_{rel}$ with the value ½ $v_{rel}$. This value is used in the control unit as the expected velocity decrease. This means that the control unit will behave somewhat more sensitively in accidents involving opposing accident vehicles of below-average weight (expected velocity decrease ½ $v_{rel}$ is higher than the actual velocity decrease) and will behave somewhat more robustly in accidents involving opposing accident vehicles of above-average weight (expected velocity decrease ½ $v_{rel}$ is lower than the actual velocity decrease).

This uncertainty may be hedged in the application of the control unit by tolerance considerations. If, for example, a crash test is attempted between two vehicles of average weight at a relative velocity $v_{rel,1}$, then it must be considered that an accident with a similar velocity decrease and, therefore, similar accident severity may also be caused by a collision of the host vehicle having an average mass with a vehicle having half the average mass, but at a higher relative velocity $v_{rel,2}$=1.5 $v_{rel,1}$. Similarly, a collision with a vehicle having double the average mass and at a lower relative velocity $v_{rel,3}$=⅔ $v_{rel,1}$ also results in an accident of similar severity. Thus, the relative velocity of the present test is to be varied by −33% to +50%, in order to correctly cover the range of potential opposing accident vehicles.

If the anticipatory sensor system also detects trucks, then the borderline case $m_{obj} \gg m_{ego}$ and, therefore, $v_{crash} \approx v_{rel}$ should also be considered. In this case, control unit 102 sets factor f higher than as described above. For a passenger vehicle of average weight, for example, which is to be designed for opposing collision vehicles between a truck and passenger vehicles of half the weight, factor f=⅔ with corresponding variation of the relative velocity in the application.

Parameter f, for example, is implemented as an application parameter, which is only established in the vehicle application and is stored in an overwritable memory area of control unit 102.

In a second case, the anticipatory sensor system is designed to transmit object information regarding the object to control unit 102. The mass of other vehicle 104 may be correspondingly determined with the aid of the anticipatory sensor system.

The Car2X function enables the direct communication of vehicle masses between vehicles. Here, the challenge is in the assignment of a transmitter to a message or also in the protection against signal interferences or against a willful manipulation by third parties.

The situation is different with sensor systems such as, for example, radar, video and LIDAR. In this case, the most important variable of the mass is not directly provided, but is ascertained via an object classification. The better and more detailed the available information is about the nature of the object, the more readily vehicle mass $m_{obj}$ may be determined.

For example, the anticipatory sensor system may detect the state of movement and the vehicle dimensions of other vehicle 104 or generally assign other vehicle 104 to the class "vehicle." In this case, the anticipatory sensor system assigns the object to particular object types such as, for example, passenger vehicle, truck, bicycle, pedestrian or post. Video, stereo video, LIDAR and radar or ultrasound are suitable, each with the suitable evaluation method. In this case, control unit 102 is designed to estimate the mass of the object, i.e., of other vehicle 104 via a suitable heuristic image (m_estim=f(object type, height, width, length).

Correction value 110 may, in particular, be a value which represents a mass of the object ascertained using a qualitatively high-value piece of information, whereby the image information may be represented by a sensor signal of surroundings sensor 106. In this case, a vehicle type of other vehicle 104 may be compared to data base 120, for example, via an intelligent image processing in order to ascertain mass $m_{obj}$. Certain variances as a result of non-visible boundary conditions such as, for example, payload, engine mass or tank contents, may be taken into consideration by a corresponding adaptation of relative velocity $v_{rel}$ or of correction value 110.

If the anticipatory sensor system provides object type information such as, for example, object=passenger vehicle, object=truck or object=wall, control unit 102 may then include this information in the determination of correction factor f:

$$dv_{ego} = f(\text{object type}, m_{ego}) \cdot v_{rel}$$

Control unit 102 uses factor f=1, for example, for object=wall or object=truck.

When object=passenger vehicle, control unit 102 sets factor f as described above in accordance with the net mass $m_{ego}$ of vehicle 100, for example, f=⅓ for a passenger vehicle having double the average weight.

In the case of object=motorcycle, control unit 102 sets a significantly lower correction factor f, for example, f=0.15.

In all cases, the remaining uncertainty regarding object mass $m_{obj}$ is to be covered, for example, by varying relative velocity $v_{rel}$ in the application. Since the object type per se results in a limitation of the mass range, smaller variations than in the absence of object information are sufficient.

In a third case, the anticipatory sensor system provides information about a collision type, for example, about a degree of overlap, an offset or an angle. In this case, control unit 102 corrects the expected velocity decrease, if necessary, by an additional correction factor g, which accounts for the reduced velocity decrease as a result of rotatory collision components.

In a fourth case, in which the two vehicles 100, 104, as shown by way of example in FIG. 1, are linked together, the vehicle masses may also be communicated between vehicles 100, 104. This information may then be used together with relative velocity $v_{rel}$ ascertained by the anticipatory sensor system in order to accurately estimate expected velocity decrease $dv_{ego}$:

$$dv_{ego} = f(m_{obj}, m_{ego}) \cdot v_{rel}$$

where $$f(m_{obj}, m_{ego}) = \frac{m_{obj}}{m_{ego} + m_{obj}}$$

Various options as to how the expected velocity decrease may be used in an airbag triggering algorithm are described below.

One standard application, for example, is the influencing of triggering thresholds on processed signals of the crash sensor system, for example, an acceleration sensor system, as a function of expected velocity decrease $dv_{ego}$. This may take place in stages, for example, based on velocity classes, or continuously.

In one alternative algorithm design, which may be made up of various triggering paths linked to one another via OR operator, control unit 102 unblocks certain triggering paths only if expected velocity decrease $dv_{ego}$ is within a particular reference value range. Very sensitive triggering paths, for example, are unblocked only if velocity decrease $dv_{ego}$ is very high.

Alternatively, control unit 102 is designed to form combined features from signals of an acceleration sensor system and expected velocity decrease $dv_{ego}$. These features may be further evaluated in the airbag triggering algorithm and incorporated into the triggering decision.

An application methodology is described by way of example below, with which the influence of expected velocity decrease $dv_{ego}$ from crash hall tests may be preferably correctly applied to vehicle-to-vehicle collisions.

Ideally, a sufficient number of vehicle-to-vehicle collisions are available for the application of airbag triggering algorithms in combination with an anticipatory sensor system, in which the anticipatory sensor system detects the object vehicle and ascertains relative velocity $v_{rel}$ and control unit 102 corrects relative velocity $v_{rel}$ by factor f and subsequently influences the triggering algorithm.

Mainly standardized crash hall tests with barriers that are stationary and of infinite weight are typically available for the application of airbag triggering algorithms. The following difficulties arise with respect to the use of relative velocity $v_{rel}$ for determining the velocity decrease.

On the one hand, crash hall barriers are generally not detected as an object by present anticipatory sensors. On the other hand, the correction of relative velocity $v_{rel}$ by factor f, which is derived from the application "finite object mass," is not applicable or only partly applicable to crash hall tests with barriers of "infinite" weight.

Crash hall tests may nevertheless be used for the application of anticipatory systems. The basis for this is the fact that rigid barrier crashes (the term is used synonymously for object masses of infinite weight) may be modeled on equivalent vehicle-to-vehicle collisions, which exhibit a comparable velocity decrease and a comparable damage pattern.

Thus, for reasons of symmetry, it is easy to understand that a rigid barrier crash with full overlap and with velocity $v_{crash}$, which results in a velocity decrease $dv_{ego} = v_{crash}$, corresponds specifically to a vehicle-to-vehicle collision of two identical vehicles with full overlap and $v_{ego} = v_{crash}$ and $v_{obj} = -v_{crash}$, i.e., $v_{rel} = 2v_{crash}$. In general, it is the case that such a barrier crash is also equivalent to a crash of vehicles of different mass with a relative velocity of $v_{rel} = v_{crash} \cdot (m_{ego} + m_{obj})/m_{obj}$, if both vehicles have a similar mass-to-stiffness ratio.

The vehicle velocity of crash hall tests therefore already represents the expected velocity decrease, as it results in equivalent vehicle-to-vehicle collisions only after a mass correction of relative velocity $v_{rel}$ via factor f. This means that in the application to crash hall tests, the value of the crash velocity divided by correction factor f should be used as the relative velocity.

The potential uncertainty in the field regarding the mass of the opposing vehicle should be hedged by varying the relative velocity.

Figure 2:
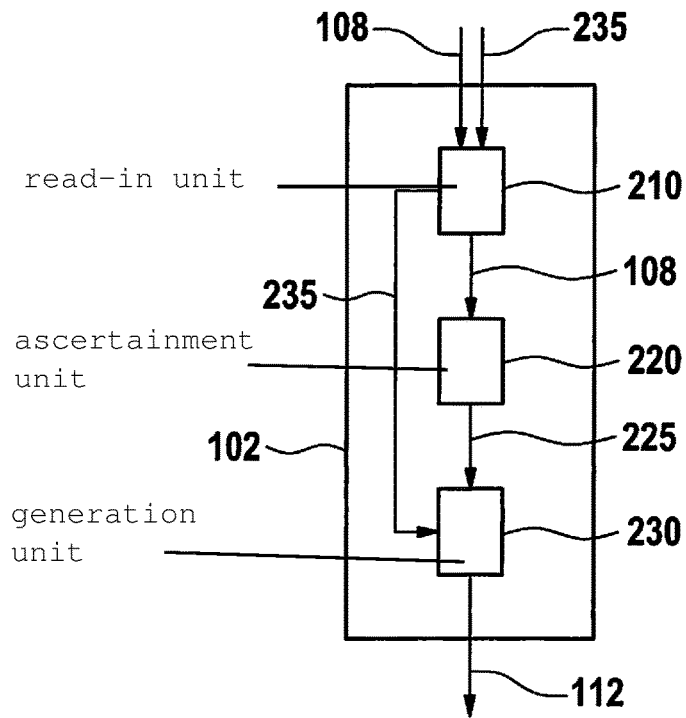
FIG. 2 schematically shows a control unit according to one exemplary embodiment.

FIG. 2 schematically shows a depiction of a control unit 102 according to one exemplary embodiment, for example, of a control unit as is described above with reference to FIG. 1. Control unit 102 includes a read-in unit 210 for reading in relative velocity value 108 and correction value 110. Connected to read-in unit 210 is an ascertainment unit 220, which is designed to ascertain a velocity reduction value 225, which represents velocity decrease $dv_{ego}$ of the vehicle when colliding with another vehicle, using relative velocity value 108 and correction value 110. A generation unit 230 is designed to receive velocity reduction value 225 from ascertainment unit 220 and to generate activation signal 112 using velocity reduction value 225.

According to one optional exemplary embodiment, read-in unit 210 is designed to also read in a sensor signal 235, which represents, for example, a signal generated by a classic crash sensor system, such as an acceleration sensor system or a pressure sensor system, and to transmit it to generation unit 230. Generation unit 230 in this case is designed to generate activation signal 112 using sensor signal 235. For example, generation unit 230 adapts threshold values for processed acceleration signals or processed pressure signals based on the expected velocity reduction value.

Figure 3:
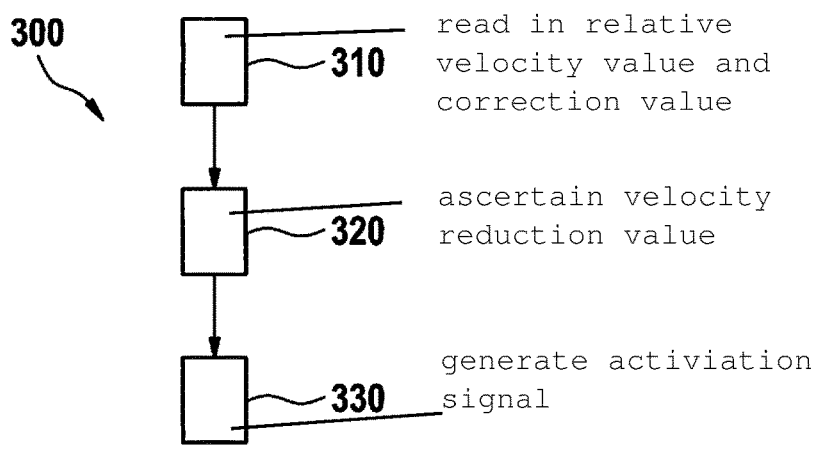
FIG. 3 shows a flow chart of a method according to one exemplary embodiment.

FIG. 3 shows a flow chart of a method 300 according to one exemplary embodiment. Method 300 for activating a passenger protection device of a vehicle may, for example, be carried out in connection with a control unit described above with reference to FIGS. 1 and 2. Method 300 includes a step 310, in which the relative velocity value and the correction value are read in. In another step 320, the velocity reduction value is ascertained using the relative velocity value and the correction value, in particular, for example, by multiplying the relative velocity value by the correction factor derived from the correction value. Finally, the activation signal for activating the passenger protection device is generated in a step 330 using the velocity reduction value.

Steps 310, 320, 330 may be carried out continuously.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for activating a passenger protection device of a vehicle, the method comprising:
reading in a relative velocity value which represents a relative velocity between the vehicle and an object;
ascertaining a velocity reduction value which represents a velocity decrease of the vehicle when the vehicle collides with the object, using the relative velocity value; and
generating an activation signal for activating the passenger protection device using the velocity reduction value;
wherein the reading in includes reading in at least one correction value, and the ascertaining includes ascertaining the velocity reduction value using the correction value, and
wherein the object is another vehicle, and wherein a control unit is configured to read in the at least one correction value via an interface to a vehicle-external database, which is connected via an additional interface to the another vehicle, wherein the vehicle and the another vehicle are each connected via an interface to the vehicle external database, or wherein the control unit is configured to read in the at least one correction value via the another vehicle.

2. The method as recited in claim 1, wherein in the ascertaining, a correction factor is determined and the relative velocity value is multiplied by the correction factor in order to ascertain the velocity reduction value.

3. The method as recited in claim 1, wherein in the ascertaining, a correction factor is determined and the relative velocity value is multiplied by the correction factor to ascertain the velocity reduction value, the correction factor being determined using the correction value.

4. The method as recited in claim 1, wherein in the reading in, a value is read in as the correction value, the correction value represents at least one of a mass of the vehicle, a mass of the object, a type of the object, a size of the object, and a restitution coefficient.

5. The method as recited in claim 3, wherein in the ascertaining, the velocity reduction value is ascertained using the following equation:

$$dv_{ego} = v_{rel} \frac{m_{obj}}{m_{ego} + m_{obj}}$$

in which $v_{rel}$ is the relative velocity between the vehicle and the object, $m_{obj}$ is the mass of the object, and $m_{ego}$ is the mass of the vehicle.

6. The method as recited in claim 1, wherein in the ascertaining, a value is ascertained as the velocity reduction value, which is smaller than the relative velocity value.

7. The method as recited in claim 1, further comprising:
changing the relative velocity value in order to obtain a changed relative velocity value, the velocity reduction value being ascertained in the ascertaining using the changed relative velocity value.

8. The method as recited in claim 1, wherein in the reading in, a value is read in as the correction value which represents at least one value read in via an interface at least one of: (i) to at least one other vehicle, and (ii) to a vehicle-external database.

9. The method as recited in claim 1, wherein in the reading in, a sensor signal generated by least one sensor of the vehicle is read in, the activation signal being generated in the generating using the sensor signal.

10. The method as recited in claim 1, wherein in the reading in, an additional correction value is read in, the additional correction value representing a rotation energy of the vehicle during the collision, the velocity reduction value being ascertained in the ascertaining using the additional correction value.

11. The method as recited in claim 1, wherein in the generating, the activation signal is generated in order to modify at least one activation threshold value for activating the passenger protection device.

12. The method as recited in claim 1, wherein in the generating, the activation signal is generated if the velocity reduction value at least one of: (i) lies within at least one reference value range, and (ii) is greater than at least one reference value.

13. The method as recited in claim 12, wherein in the generating, the activation signal is generated in order to lower the activation threshold value if the velocity reduction value is greater than the reference value.

14. The method as recited in claim 1, wherein crash hall tests on barriers having a mass of virtually infinite weight and at a crash velocity $v_{crash}$ are used as representatives of vehicle-to-vehicle crashes with $v_{rel}=v_{crash}*(m_{ego}+m_{obj})/m_{obj}$, this $v_{rel}$ being used for the application while taking the potential uncertainties for $m^{obj}$ into consideration, in which $v_{rel}$ is the relative velocity between the vehicle and the object, $m^{obj}$ is the mass of the object, and $m_{ego}$ is the mass of the vehicle.

15. A control unit to activate a passenger protection device of a vehicle, comprising:
a control device configured to perform the following:
reading in a relative velocity value which represents a relative velocity between the vehicle and an object;
ascertaining a velocity reduction value which represents a velocity decrease of the vehicle when the vehicle collides with the object, using the relative velocity value; and
generating an activation signal for activating the passenger protection device using the velocity reduction value;
wherein the reading in includes reading in at least one correction value, and the ascertaining includes ascertaining the velocity reduction value using the correction value, and
wherein the object is another vehicle, and wherein a control unit is configured to read in the at least one correction value via an interface to a vehicle-external database, which is connected via an additional interface to the another vehicle, wherein the vehicle and the another vehicle are each connected via an interface to the vehicle external database, or wherein the control unit is configured to read in the at least one correction value via the another vehicle.

16. A non-transitory machine-readable memory medium on which is stored a computer program, which is executable by a processor, comprising:
a program code arrangement having program code for activating a passenger protection device of a vehicle, by performing the following:
reading in a relative velocity value which represents a relative velocity between the vehicle and an object;
ascertaining a velocity reduction value which represents a velocity decrease of the vehicle when the vehicle collides with the object, using the relative velocity value; and generating an activation signal for activating the passenger protection device using the velocity reduction value;

wherein the reading in includes reading in at least one correction value, and the ascertaining includes ascertaining the velocity reduction value using the correction value, and wherein the object is another vehicle, and wherein a control unit is configured to read in the at least one correction value via an interface to a vehicle-external database, which is connected via an additional interface to the another vehicle, wherein the vehicle and the another vehicle are each connected via an interface to the vehicle external database, or wherein the control unit is configured to read in the at least one correction value via the another vehicle.

* * * * *